United States Patent
Scott

(10) Patent No.: US 8,914,468 B2
(45) Date of Patent: Dec. 16, 2014

(54) SYSTEM AND METHOD FOR PROVIDING ACCESS LINKS IN A MEDIA FOLDER

(75) Inventor: Sherryl Lee Lorraine Scott, Toronto (CA)

(73) Assignee: BlackBerry Limited (CA)

( * ) Notice: Subject to any disclaimer, the term of this patent is extended or adjusted under 35 U.S.C. 154(b) by 239 days.

(21) Appl. No.: 12/395,212

(22) Filed: Feb. 27, 2009

(65) Prior Publication Data

US 2010/0223356 A1      Sep. 2, 2010

(51) Int. Cl.
*G06F 15/16*      (2006.01)
*H04M 1/725*      (2006.01)

(52) U.S. Cl.
CPC ................................ *H04M 1/72561* (2013.01)
USPC .......................................... 709/218; 709/225

(58) Field of Classification Search
USPC .................................................. 709/217–229
See application file for complete search history.

(56) References Cited

U.S. PATENT DOCUMENTS

| | | | |
|---|---|---|---|
| 7,284,008 B2 | 10/2007 | Henkin et al. | |
| 7,874,006 B2* | 1/2011 | Hassan et al. | 726/26 |
| 2002/0137507 A1 | 9/2002 | Winkler | |
| 2002/0138345 A1 | 9/2002 | Dickson et al. | |
| 2002/0194061 A1 | 12/2002 | Himmel et al. | |
| 2003/0017822 A1* | 1/2003 | Kissner et al. | 455/411 |
| 2005/0039136 A1 | 2/2005 | Othmer | |
| 2006/0095543 A1* | 5/2006 | Ito et al. | 709/218 |
| 2006/0253437 A1 | 11/2006 | Fain et al. | |
| 2007/0021145 A1 | 1/2007 | Lam | |
| 2007/0100690 A1 | 5/2007 | Hopkins | |
| 2007/0240079 A1* | 10/2007 | Flynt et al. | 715/810 |
| 2007/0293247 A1 | 12/2007 | Bhat et al. | |
| 2008/0268772 A1* | 10/2008 | Linnamaki et al. | 455/3.04 |
| 2009/0077497 A1* | 3/2009 | Cho et al. | 715/814 |

(Continued)

FOREIGN PATENT DOCUMENTS

| | | |
|---|---|---|
| CA | 2693868 C | 1/2014 |
| CN | 101026467 A | 8/2007 |

(Continued)

OTHER PUBLICATIONS

Apple: iPhone 3G user manual: Jul. 11, 2008, [Online], Jul. 11, 2008, pp. 1-154, XP007907619 Retrieved from the Internet: URL:http://manuals.info.apple.com/en_US/iPhone_User_Guide.pdf>   pp. 59-69, 118-130.

(Continued)

*Primary Examiner* — Yasin Barqadle
(74) *Attorney, Agent, or Firm* — Schwegman Lundberg & Woessner, P.A.

(57) ABSTRACT

There is disclosed a system and method of providing access links in a media folder. In an embodiment, the method comprises: receiving as an access trigger one of a search term or short code corresponding to content in the media folder; displaying at least one access link in response to the access trigger; and in response to selection of an access link, providing access to a corresponding media resource. The access trigger may be received from one of an input field, a history log or content usage statistics, and the method may display a list of access links to media resources related to the content of the media folder. The access trigger is directly linked to content provided in the media folder in order to provide users with a convenient way to link to access links to related media resources.

23 Claims, 11 Drawing Sheets

(56) References Cited

U.S. PATENT DOCUMENTS

2009/0123899 A1* 5/2009 Bates ................. 434/307 R
2009/0305731 A1* 12/2009 Kim ..................... 455/466
2010/0070385 A1* 3/2010 Wassingbo et al. ......... 705/27

FOREIGN PATENT DOCUMENTS

| EP | 2026215 A | 2/2009 |
|---|---|---|
| WO | 0213552 A | 2/2002 |
| WO | 2008084211 A | 7/2008 |

OTHER PUBLICATIONS

Anonymous: "iPod: How to use th search feature", Internet Article, [Online], Sep. 20, 2007, pp. 1-3, XP002540411 Retrieved from the Internet: URL:http://support.apple.com/kb/TA38485?viewlocale=en_US> [retrieved on Aug. 7, 2009] whole document.

McNulty S: :Review: iTunes 8. MacWorld, [Online], Sep. 13, 2008, XP002540182 Retrieved from the Internet: URL:http://www.macworld.com/article/135521/2008/09/itunes8.html> [retrieved on Aug. 5, 2009] passage Genius.

Breen C: "First look: Songbird", MacWorld, [Online], Dec. 18, 2008, XP002540181 Retrieved from the Internet: URL:http://www.macworld.com/article/137637/2008/12/songbirdfirstlook.html> [retrieved on Aug. 5, 2009] whole document.

Examination Report dated Sep. 24, 2010 from EP09154041.

Examination Report dated Jan. 10, 2011 from EP09154035.

"Canadian Application Serial No. 2,693,868, Response filed Nov. 16, 2012 to Office Action mailed May 31, 2012", 3 pgs.

"Chinese Application Serial No. 201010188011.9, Office Action mailed Feb. 22, 2013", w/English Translation, 9 pgs.

"Chinese Application Serial No. 201010188011.9, Office Action mailed Sep. 10, 2013", w/English translation, 8 pgs.

"Chinese Application Serial No. 201010188011.9, Response filed May 9, 2013 to Office Action mailed Feb. 22, 2013", w/English claims, 6 pgs.

"Chinese Application Serial No. 201010188011.9, Response filed Oct. 19, 2012 to Office Action mailed Jun. 5, 2012", w/English claims, 6 pgs.

"U.S. Appl. No. 12/395,212, Response filed May 12, 2014 to Final Office Action mailed Apr. 4, 2014", 10 pgs.

"U.S. Appl. No. 12/395,212, Response mailed Jan. 27, 2014 to Non Final Office Action mailed Nov. 8, 2013", 11 pgs.

"European Application Serial No. 09154035.1, Summons to Attend Oral Proceedings mailed Apr. 7, 2014", 4 pgs.

* cited by examiner

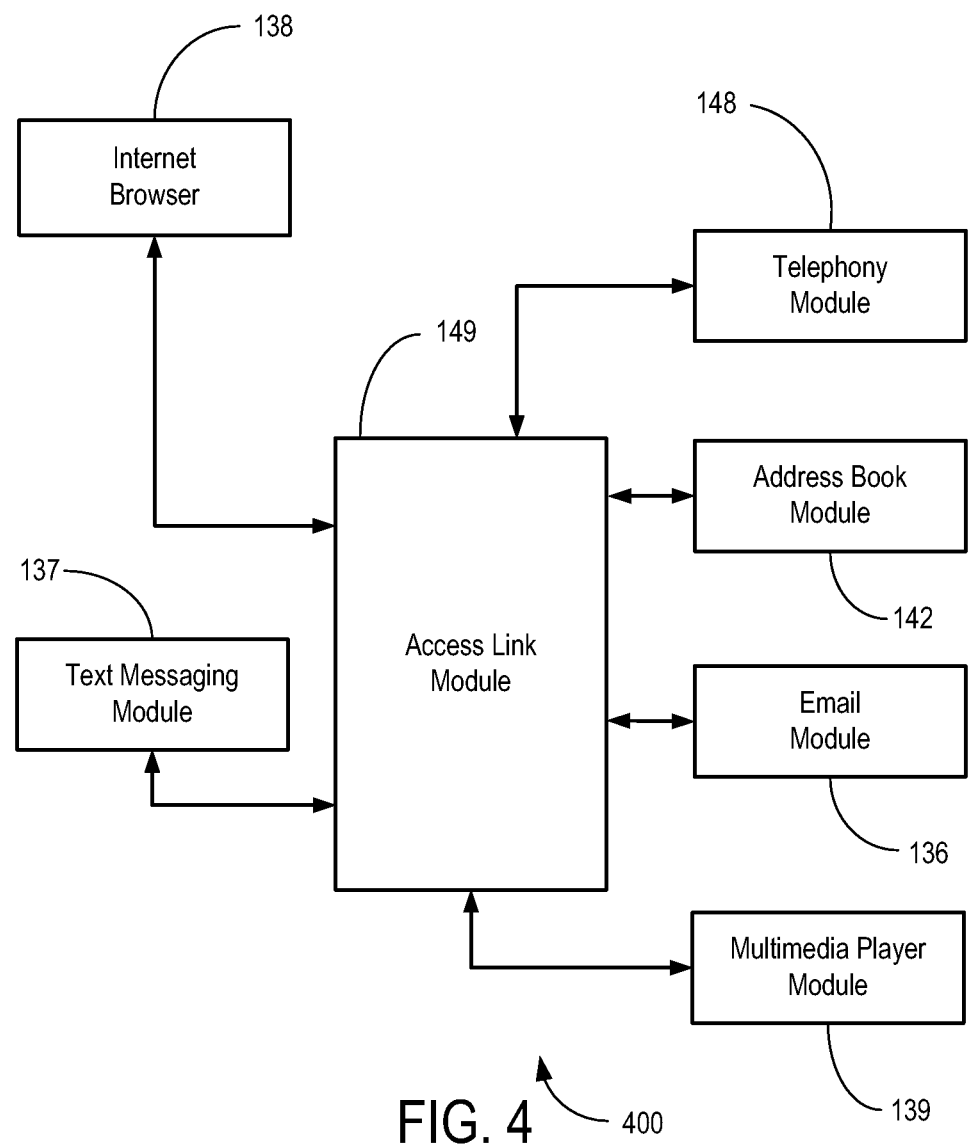
FIG. 4 — 400

SYSTEM AND METHOD FOR PROVIDING ACCESS LINKS IN A MEDIA FOLDER

The present disclosure relates generally to telecommunications devices, and more particularly to providing access links on such devices.

BACKGROUND

Some handheld mobile communication devices include a media folder application which may allow playback or viewing of audio, photo, and video as appropriate to the media type. The media folder application provides a user interface (UI) which allows management of the content including selecting the files to be played or viewed as appropriate to the media type. On some of these handheld mobile communication devices, a dialing feature may also be provided to allow a user to "dial" frequently called numbers more quickly and accurately by assigning dialing short codes, or short numbers, which are special telephone numbers significantly shorter than their full length equivalents and are designed to be easier to memorize and faster to use. For example, in the United States, the short code 2653 corresponding to "COKE" as spelled out on a typical telephone keypad is registered to The Coca-Cola™ Company.

BRIEF DESCRIPTION OF THE DRAWINGS

In the figures which illustrate exemplary embodiments:

FIG. 4 is a schematic block diagram of modules of a system in accordance with an embodiment;

DETAILED DESCRIPTION

As noted above, the present disclosure relates to a system and method for providing short code access link functions in a media folder, and particularly in mobile communication devices.

Figure 1:
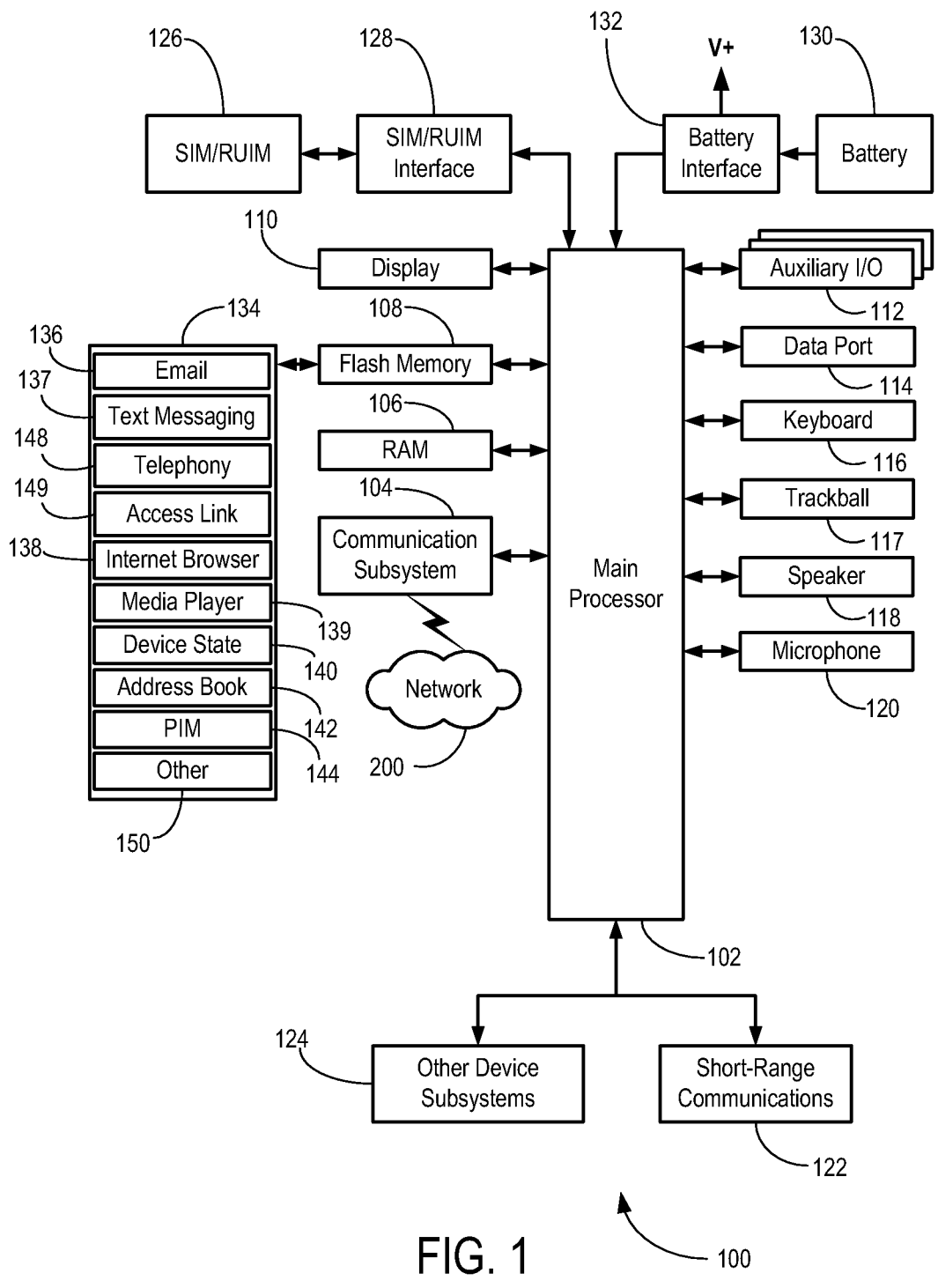
FIG. 1 is a schematic block diagram of various components of a handheld communication device.

In an illustrative embodiment, the principles of the present disclosure may be practiced with a mobile communication device in a wireless operating environment. Shown in FIG. 1 is a schematic block diagram of an illustrative mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and sends messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122 and other device subsystems 124. In some embodiments, the keyboard 116 may comprise a virtual keyboard or a physical keyboard or both. In some embodiments, the display 110 may comprise a touch screen display.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing depression of the trackball to allow selection of a highlighted item.

Operating system software used by the main processor 102 is typically stored in a persistent store such as flash memory 108. Those skilled in the art will appreciate that the operating system, specific device applications, or parts thereof, may be temporarily loaded into a volatile store such as the RAM 106.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. In some embodiments, the communication device 100 may be solar powered or otherwise powered with or without use of a battery.

The main processor 102, in addition to its operating system functions, enables execution of various software applications 134 on the communication device 100. A subset of software applications 134 that control basic device operations, including data and voice communication applications, will normally be installed on the communication device 100 during its manufacture.

Software applications 134 may include an email module 136. Email module 136 can be any suitable email software program that allows a subscriber or user of the communication device 100 to send and receive email communications. Various alternatives exist for the messaging application 136 as is well known to those skilled in the art. Messages that have been sent or received by the device are typically stored in local storage such as flash memory 108 of the communication device 100, or in some other suitable storage element in the communication device 100. In an alternative embodiment, some of the sent and received messages may be stored remotely from the device 100 such as in a data store of an associated host system that the communication device 100 communicates with.

Software applications 134 may also include a text messaging module 137 for sending and receiving Short Message Service (SMS) text messages on device 100. Furthermore, software applications 134 may include a telephony module 148 for supporting various telephony functions on device 100, including various speed dialing functions such as speed dial keys, voice activated dialing, and/or short code dialing. Telephony module 148 may be operatively integrated with communication subsystem 104, keyboard 116, trackball 117, speaker 118, and microphone 120. Telephony module 148 may also be integrated with address book 142, e-mail module 136, text messaging module 137, Internet browser 138, RAM 106, flash memory 108 and display 110 to perform various other telephony functions on device 100.

Still referring to FIG. 1, software applications 134 may further include an access link module 149. Access link module 149 may be configured to provide a number of access links in response to various access triggers or events. For example, the access trigger may be a search term or "short code" entered by a user. As another example, the access trigger may be a certain date/time, or the user carrying the device 100 into a particular location or region. The access link module 149 is described in more detail further below.

In the present context, as will be explained in more detail further below, a "short code" generally refers to a short telephone number that can be used for text messaging, i.e., SMS (Short Message Service) messaging, or MMS (Multimedia Message Service) messaging. Short codes are shorter than full telephone numbers that follow the E.164 standard. For ease of reference, a short code may be used herein to refer to a numerical short code, or a vanity short code used in mnemonic dialing, or both. Thus, a short code may correspond to a shorthand representation of a word, name, person, place or thing, such as the name of an artist, song, album, or video title, or other text, that is created for a specific purpose, such as for accessing a time limited promotion. For example, an artist named Jennifer Lopez may be known by the moniker "JLO". A corresponding short code to access a special offer to download her latest hit song may be represented by the numerical short code 4556, for example, which may correspond to a mnemonic for the short code, i.e., a vanity short code, namely, "4JLO". As another example, a special offer or promotion associated with a store such as HMV™ music stores may be represented by the short code 4468, corresponding to the vanity form of the short code "4HMV". These and various other examples of short codes are discussed further below.

The device 100 may further include a device state module 140, a Personal Information Manager (PIM) 144, and various other modules 150. Additional software applications may also be loaded onto the communication device 100 through at least one of the wireless network 200, the auxiliary I/O subsystem 112, the data port 114, the short-range communications subsystem 122, or other device subsystem 124.

To identify a user, the communications device 100 may use a SIM/RUIM/USIM card 126 (i.e. Subscriber Identity Module or a Removable User Identity Module or a Universal Subscriber Identity Module, etc.), which is inserted into a SIM/RUIM/USIM interface 128, to communicate with a network. The SIM/RUIM/USIM card 126 is one type of a conventional "smart card" that can be used to identify a user of the communications device 100 and to personalize the communications device 100, among other things. Without the SIM/RUIM/USIM card 126, the communications device 100 may not be fully operational for communication with the wireless network 200, in some embodiments. By inserting the SIM/RUIM/USIM card 126 into the SIM/RUIM/USIM interface 128, a user can access subscribed services. Such subscribed services may include, for example, web browsing and messaging such as email, voice mail, SMS, and Multimedia Messaging Services (MMS).

Figure 2:
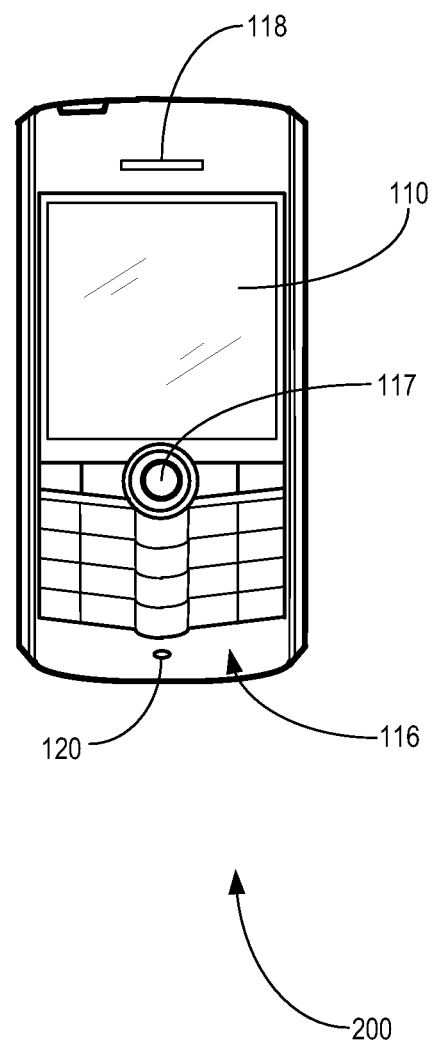
FIG. 2 is an illustrative front view of a handheld communication device including the various components as shown in FIG. 1.

Now referring to FIG. 2, shown is an illustrative front view of a handheld mobile communication device 200 that may provide a suitable operating environment. As shown, the communication device 100 may include a display 110, a keyboard 116, and other input or navigation means such as a trackball 117. The display 110 may be configured to display various screens allowing the user of device 100 to view screen outputs from the various software applications 134, including the image applications 148. Display 110 may also be configured to provide a touch-sensitive screen input in response to a prompt or query displayed on display 110. Device 100 further includes an earpiece or speaker 118 and a microphone 120 in order to support the telephony functions previously described.

Figure 3:
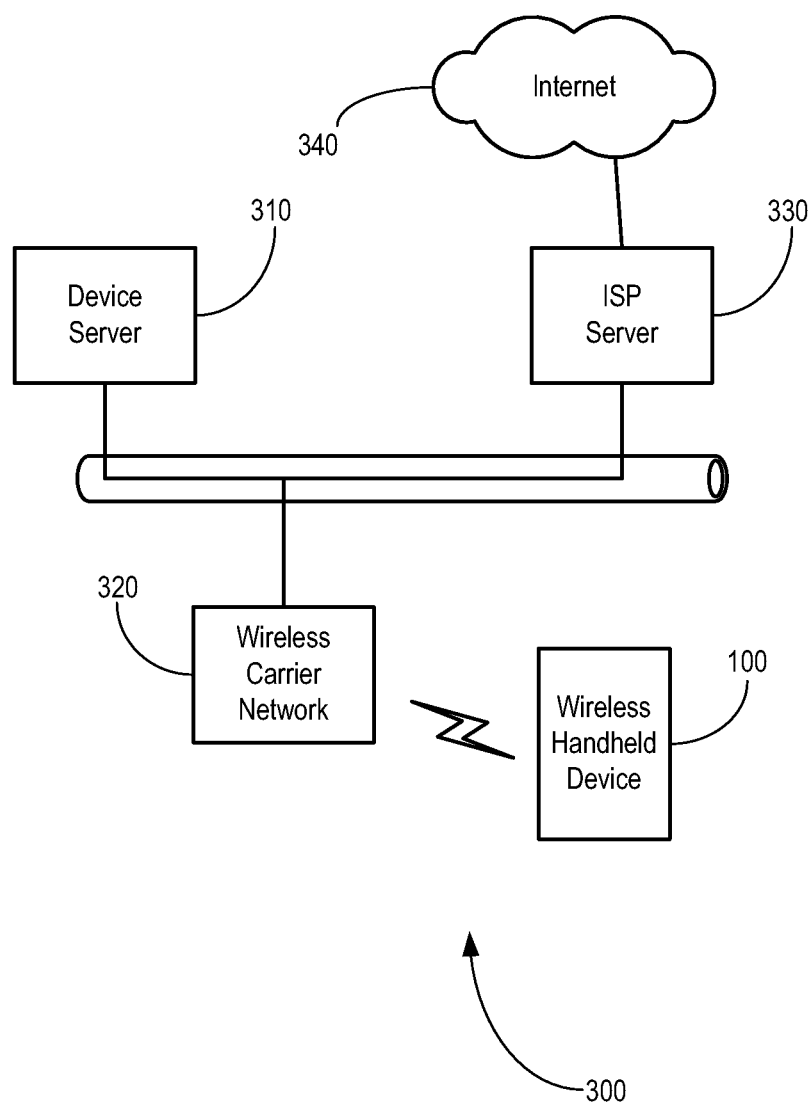
FIG. 3 is a schematic block diagram of a network environment in which the device of FIG. 1 and FIG. 2 may operate.

Now referring to FIG. 3, shown is a schematic block diagram of an illustrative network 300, which may provide a suitable operating environment. As shown, network 300 includes a device server 310 for hosting various server applications for device 100. Network 300 further includes a wireless carrier network 320 which provides wireless communications between device 100 and device server 310.

Still referring to FIG. 3, network 300 also includes an ISP server 330 which provides a connection to the Internet 340. With a suitable Internet browser module 138 provided on device 100, the device 100 may access the Internet 340 via the wireless carrier network 320, and the ISP server 330. Alternatively, device 100 may connect to a local wireless network such as Wi-Fi, using short-range communications module 122.

Now referring to FIG. 4, shown is a schematic block diagram of a system 400 in accordance with an embodiment. As shown in FIG. 4, access linking module 149 is operatively connected to e-mail module 136, text messaging module 137, Internet browser module 138, multimedia folder module 139, address book module 142, and telephony module 148.

In an embodiment, access linking module 149 may be configured to operate and interact with various modules (e.g. modules 136, 137, 138, 139, 142, 148) to access information or resources. For example, access linking module 149 may be integrated with Internet browser module 138 to access a webpage. As another example, access linking module 149 may be integrated with e-mail module 136 and text messaging module 137 to send or receive e-mail to/from a specific e-mail address or text messaging number such as a short code. Access linking module 149 may also be integrated with address book module 142 and telephony module 148 to dial certain contacts or resources and perform telephony functions with those contacts or resources.

Figure 5A:
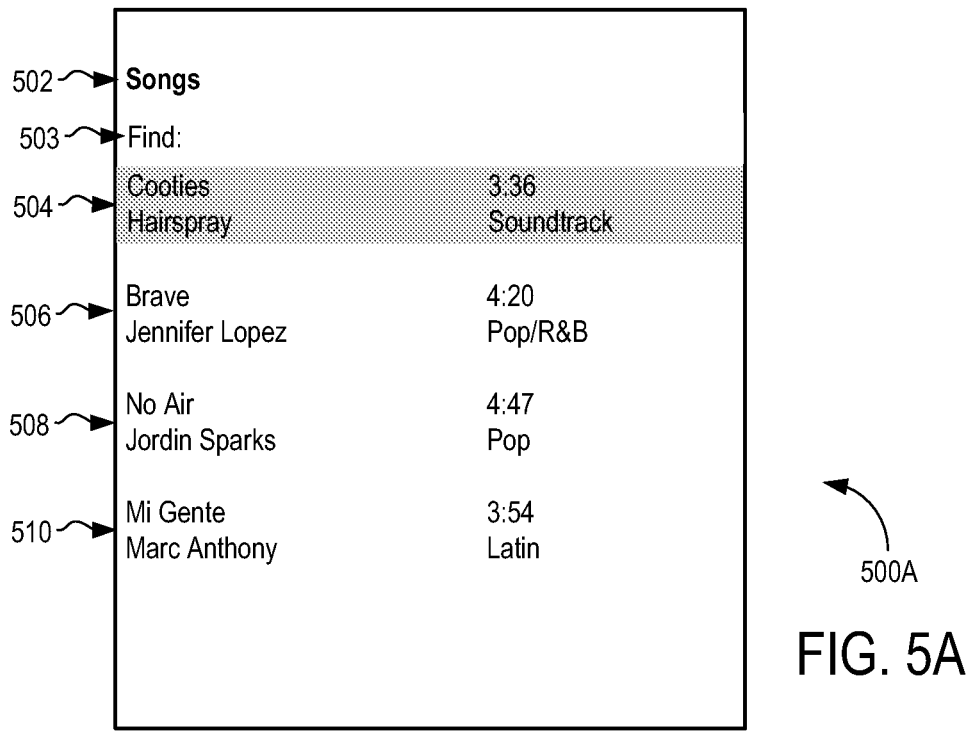
FIG. 5A shows an illustrative example of a user interface screen for a media folder in which one of the available audio files is selected for play.

Now referring to FIG. 5A, shown is an illustrative screen 500A of a media folder module 139 as may be displayed in display 110 of device 100. As shown, screen 500A includes a title 502 indicating "Songs", and a number of descriptions of audio files 504, 506, 508, 510 arranged to be selectable from a list. Thus, the content (audio files 504, 506, 508, 510) is integrated into the application. In this illustrative example, the screen 500A shows multimedia folder UI configured to playback audio files, and the currently selected audio file 504 is a song from the soundtrack of the movie, Hairspray, classified as "Soundtrack".

Figure 5B:
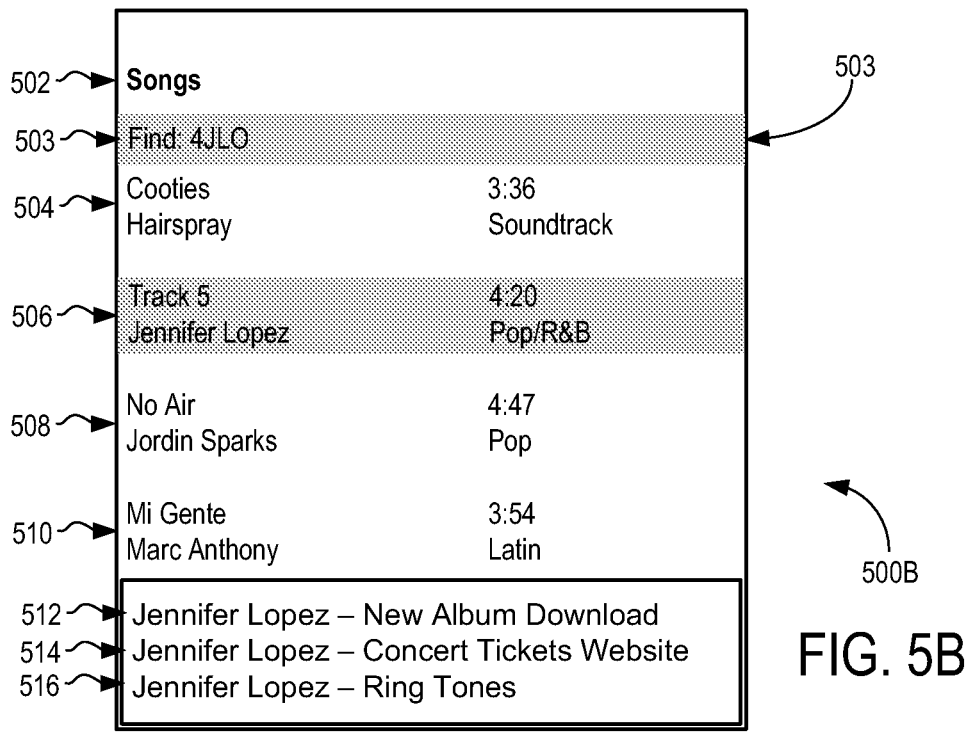
FIG. 5B shows the screen of FIG. 5A in which a short code is entered in the search field and a corresponding access link list is displayed.

Now referring to FIG. 5B, screen 500B shows an input field 503 in which entry of a vanity short code "4JLO", corresponding to the numerical short code 4556, is received. (Alternatively, the numerical short code 4556 may also be entered in input field 503, but the mnemonic "4JLO" may be easier to remember and more often used.) In this case, the entered vanity short code is the access trigger which causes access link module 149 to select audio file 506, for Jennifer Lopez, and also display a list of access links 512, 514, 516 corresponding to the search term entered at search filed 503.

Figure 5C:
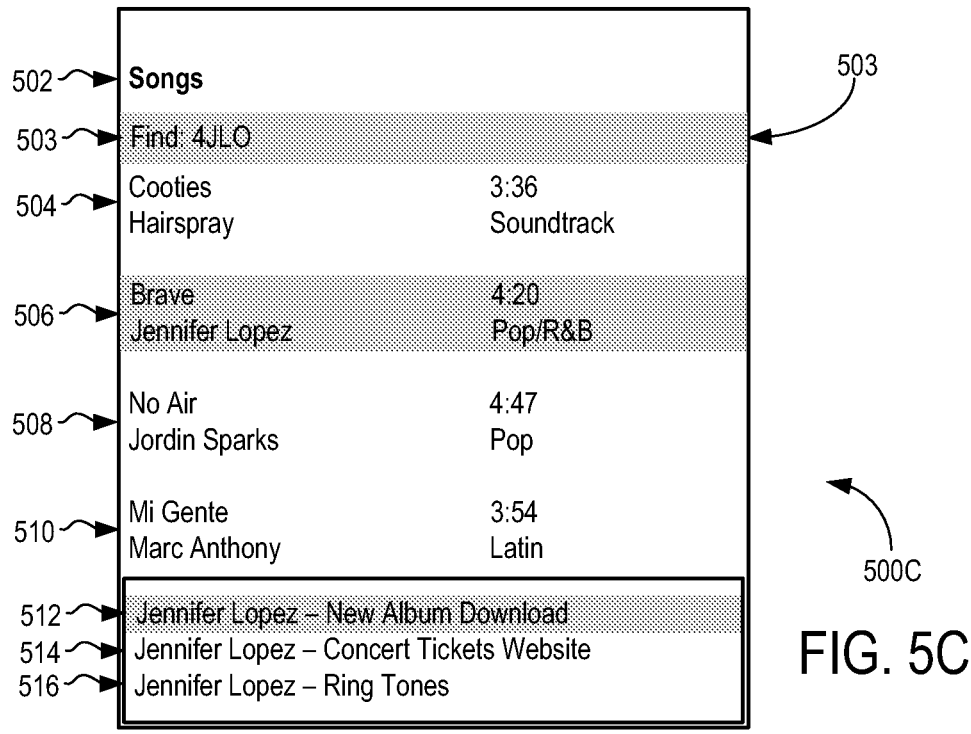
FIG. 5C shows the screen of FIG. 5B in which a first option is selected from the access link list.

Now referring to FIG. 5C, screen 500C shows the first access link 512 selected, which in this illustrative example is entitled "Jennifer Lopez—New Album Download". Selection of this first access link 512 may configure access link module 149 to access a corresponding media resource and facilitate downloading of artist Jennifer Lopez's entire new album to device 100. For example, selection of this access link 512 may cause access link module 149 to direct the device 100 to access a webpage where the order and payment information may be entered in order to download the new album.

Figure 5D:
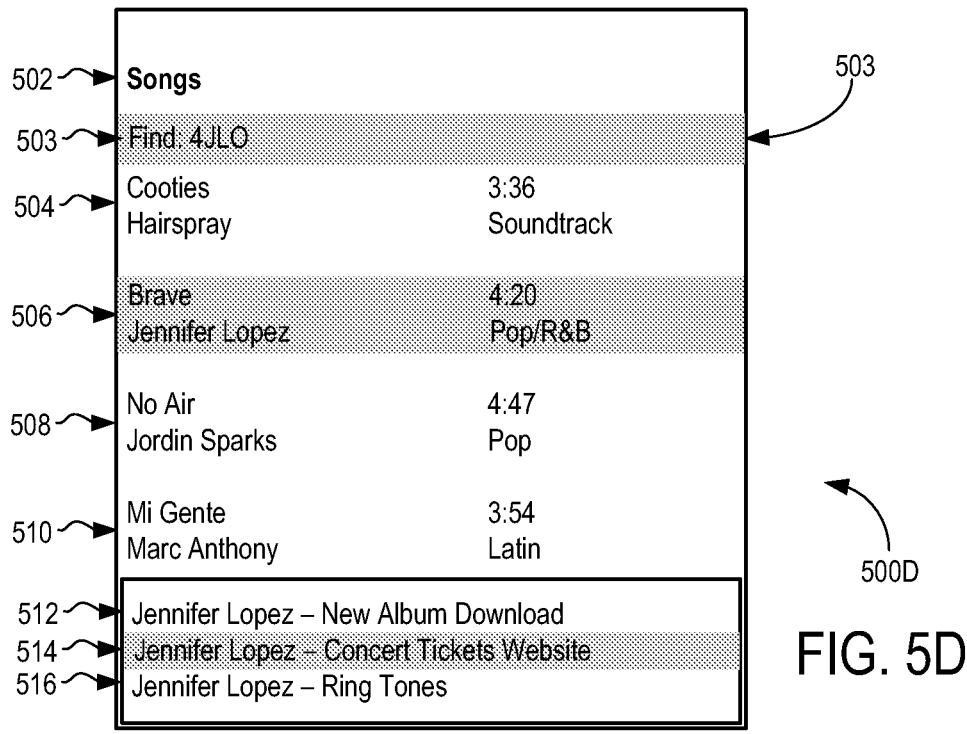
FIG. 5D shows the screen of FIG. 5B in which a second option is selected from the access link list.

Now referring to FIG. 5D, screen 500D shows the second access link 514 selected, which in this example is entitled "Jennifer Lopez—Concert Tickets Website". Selection of this second access link may configure access link module 149 to allow the device 100 to access the corresponding media resource, in this case a webpage from which concert tickets for Jennifer Lopez's concert may be offered for sale. In an embodiment, this second access link 514 for concert tickets may be time limited, and set to expire at a suitable time prior to the concert, or once the tickets have been sold out. Alternatively, upon accessing the webpage, a suitable message may be displayed to indicate that the time for ordering tickets has expired, or that the tickets have been sold out.

Figure 5E:
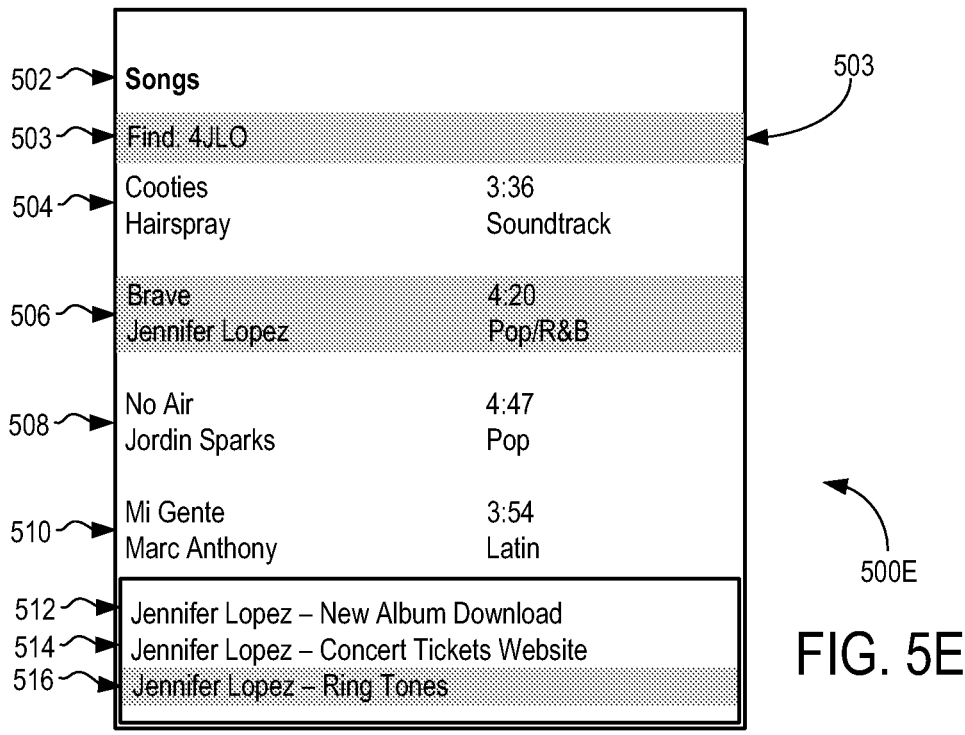
FIG. 5E shows the screen of FIG. 5B in which a third option is selected from the access link list.

Now referring to FIG. 5E, screen 500E shows the third access link 516 selected, which in this example is entitled "Jennifer Lopez—Ring Tones". Selection of this access link may configure access link module 149 to access the corresponding media resource and allow the device 100 to access a webpage or SMS address from which ring tones for one or more of Jennifer Lopez's songs may be downloaded.

Figure 5F:
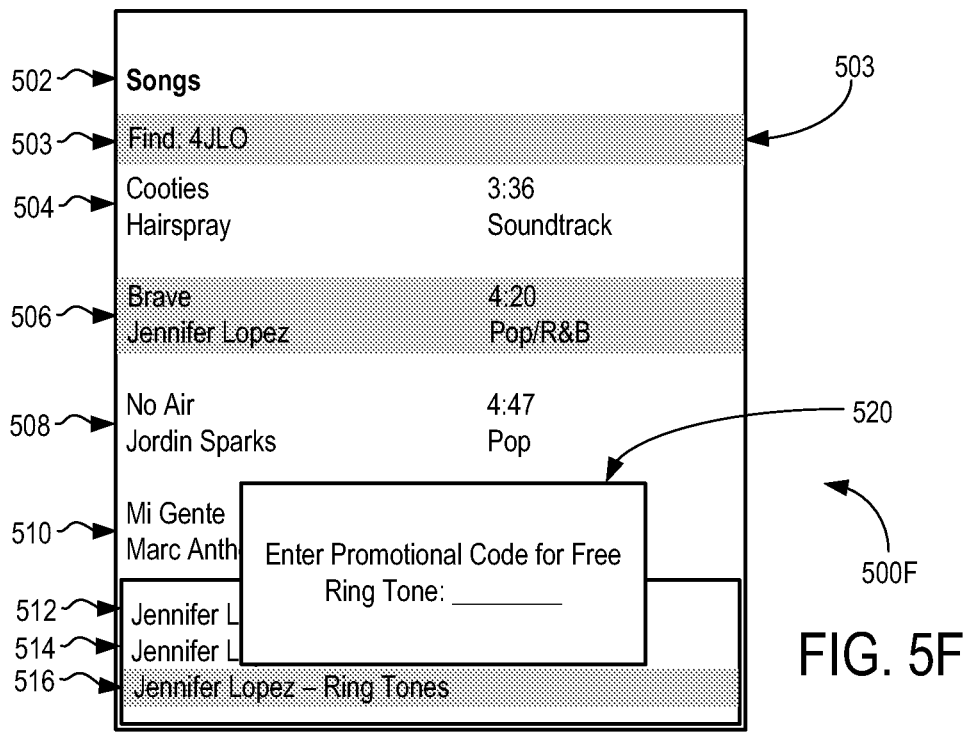
FIG. 5F shows a pop-up window appearing in response to the selection of an option in FIG. 5E.

As shown in FIG. 5F, in an embodiment, the access links 512, 514, 516 may be tied in with advertising which may potentially reduce or eliminate the cost to the user of downloading Jennifer Lopez's songs or ring tones. For example, upon selection of the third access link 516, a pop-up window 520 may appear to allow entry of a promotion code to allow the user to download a ring tone for free. For example, this free download may be a promotion run by Jennifer Lopez's record company, or may be sponsored by a third party in an arrangement with Jennifer Lopez's record company.

As will be appreciated, the media resource accessed by the access link module 149 may be any media resource that may be reachable by features provided on device 100. For example, the media resources may be based on an Internet website, an electronic mail service, a text messaging service, or a telephony service, and may be accessible by a wired connection such as USB™, or a proximity wireless connection such as Wi-Fi™ or Bluetooth™.

Figure 6A:
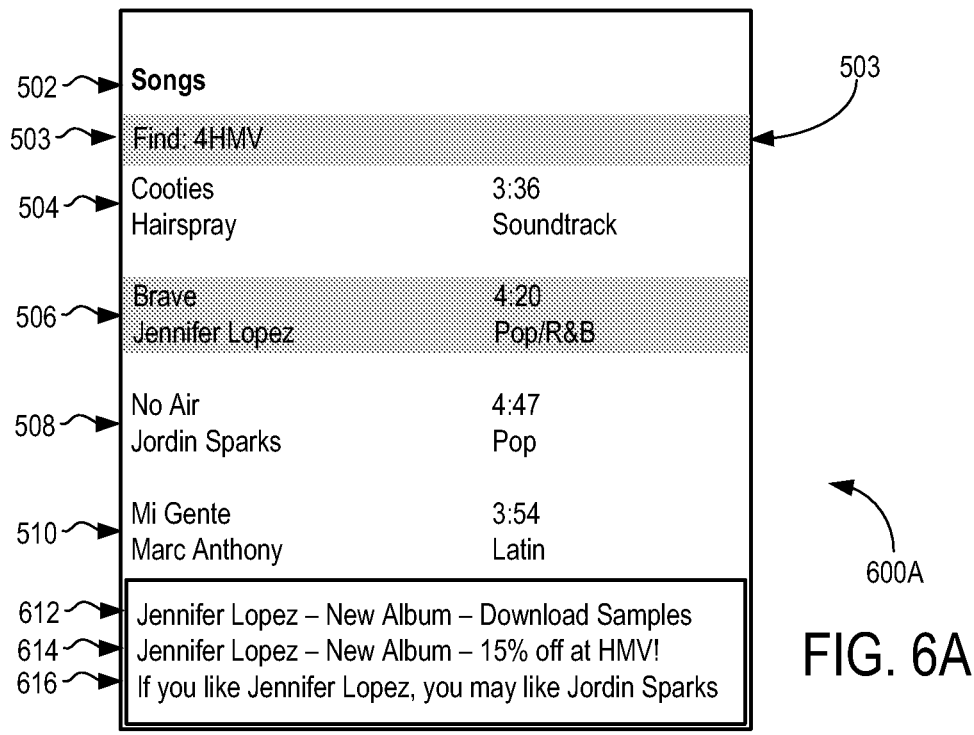
FIG. 6A shows another illustrative example of a media folder user interface in which another short code is entered in the search field and a corresponding options list is displayed.

Now referring to FIG. 6A, screen 600A shows another illustrative example in which entry of a vanity short code "4HMV", corresponding to the numerical short code 4468, is received in the input field 503. In an embodiment, in response to receiving the vanity short code 4HMV, access links 612, 614 and 616 are displayed.

In this illustrative embodiment, the unique vanity short code "4HMV" may be made exclusive to HMV stores, and may trigger access to specials available at HMV stores that may be made known to the user, for example by an advertisement (e.g. TV, radio, Internet, e-mail, SMS, etc.) telling the user to enter short code "4HMV". The HMV music store may be a retail store having physical media such as CDs and DVDs available for purchase, or an Internet website from which music may be searched and downloaded. If the music store is an online website, the user may have the option of downloading samples from an artist's new album, and may also have the option of downloading the new album for purchase. If the music store is a retail store, then samples may still be downloaded, and the user may purchase CD or DVD media from the store.

In an embodiment, the music store may suggest another artist that the user may like, given the user's interest in Jennifer Lopez. This may be done, for example, by classifying Jennifer Lopez into a genre, and recommending other popular artists in that genre, or recommending other top artists currently on a top 40 chart, or based on other recommendation logic.

Figure 6B:
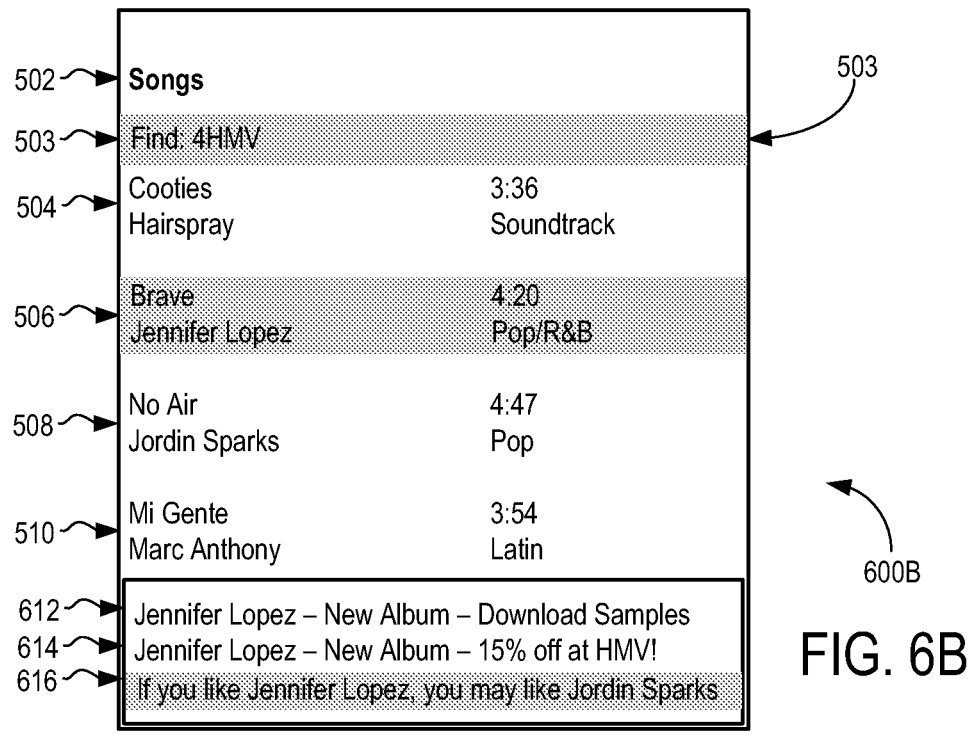
FIG. 6B shows the screen of FIG. 6A in which one of the related options is selected for access.

Now referring to FIG. 6B, screen 600B shows one of the access links 614 selected from the list of available access links 612, 614, 616. In this illustrative example, access link 616, entitled "If you like Jennifer Lopez, you may like Jordin Sparks", may configure access link module 149 to access the corresponding media resource and allow the user to review further links for Jordin Sparks. This access link 616 may be sponsored by the HMV store, or by a third party, such as a record company for example. This link may also provide a unique short code for Jordin Sparks, such as 567346 corresponding to the vanity short code "JORDIN" (not shown).

Figure 6C:
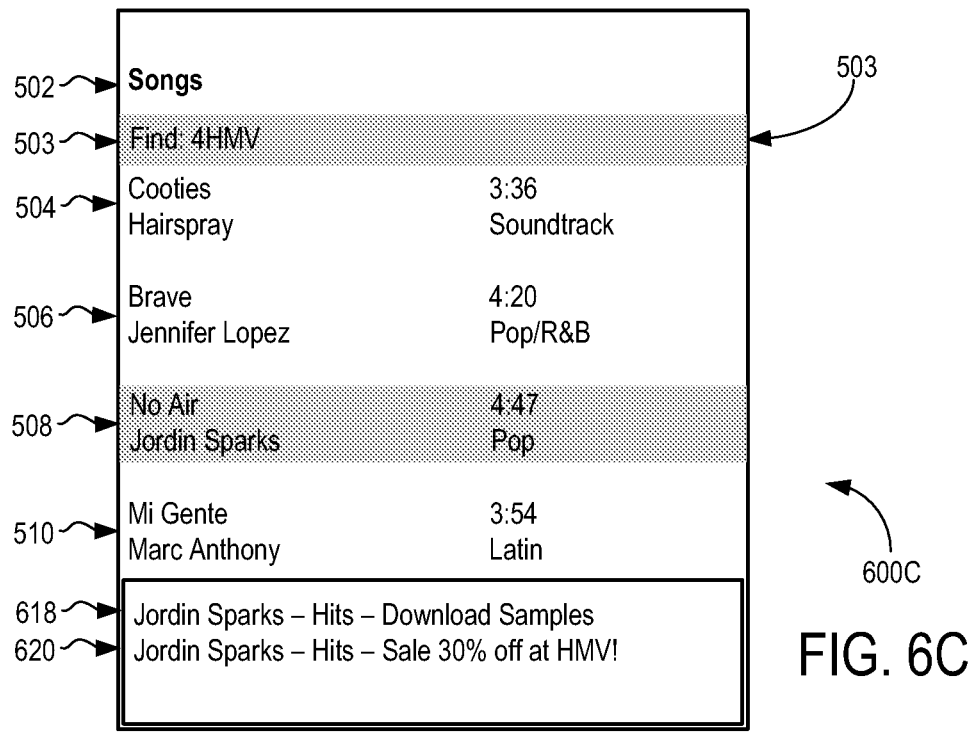
FIG. 6C shows the screen of FIG. 6A in which selection of another audio file results in a different list of options corresponding to the selected audio file.

Now referring to FIG. 6C, shown in screen 600C is an illustrative example of another embodiment in which the play list itself may trigger a notification based on the name of an artist in one of the audio files 504, 506, 508, 510. For example, the short code or keyword may be the most commonly listened to artist, song, or album in a play list. If Jordin Sparks was regularly played in the short list (e.g. by the user of device 100), then access link module 149 may be configured to identify the artist, song or album as a keyword, and locate any access links associated with the artist, song or album. In this illustrative example, the name Jordin Sparks may be highlighted as such a keyword, and audio file 508 may also be highlighted. As well, the new access links 618, 620 now relate to Jordin Sparks, and may include specials available for purchase at the store. For example, access link 618 entitled "Jordin Sparks—Hits—Download Samples" may configure access link module 149 to access the corresponding media resource and allow a user to download sample clips of songs by Jordin Sparks for review while at the HMV store.

Figure 6D:
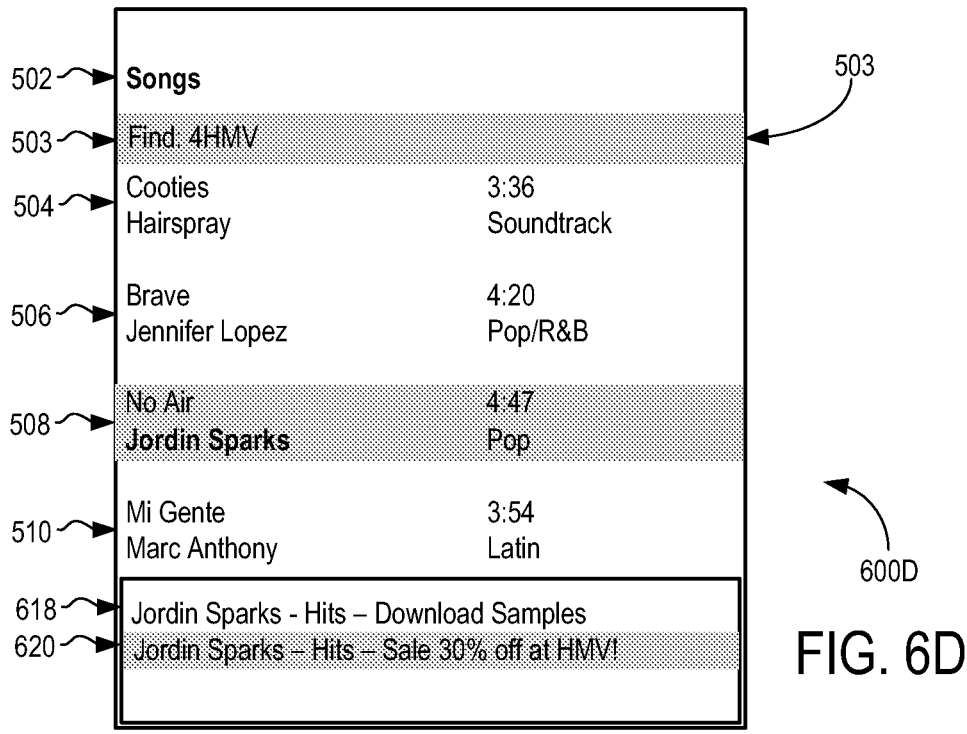
FIG. 6D shows the screen of FIG. 6A in which one of the available options is selected for access.

As shown in FIG. 6D, in another illustrative example, upon selection, access link 620 entitled "Jordin Sparks—Hits—Sale 30% off at HMV!" may configure access link module 149 to allow a user to purchase Jordin Sparks' hits for a special promotional discount at the HMV store. For example, this special discount may be made available for a limited time, and only within a certain geographic region. The geographic region may be, for example, a metropolitan area, a shopping center, or a specific retail location such as a single retail music store.

Figure 6E:
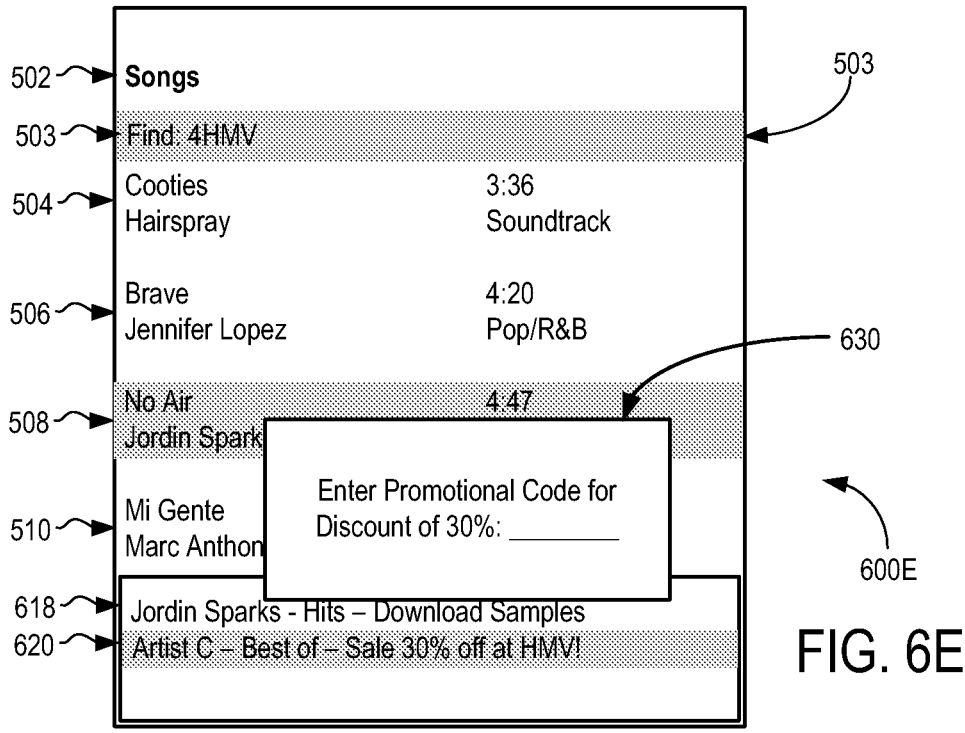
FIG. 6E shows a pop-up window appearing in response to the selection of an option in FIG. 6D.

Now referring to FIG. 6E, upon selection, access link 620 entitled "Jordin Sparks—Hits—Sale 30% off at HMV!" may configure access link module 149 to display a pop-up window 630, and prompt for entry of a promotional code for applying the discount of 30%. In an embodiment, this promotional code may be provided to the user via various advertising channels including television, radio, electronic mail, text messaging, billboards, or advertising on the Internet, etc. The promotional code may also be available as an in-store special, for example, available only at specific music store locations.

Figure 6F:
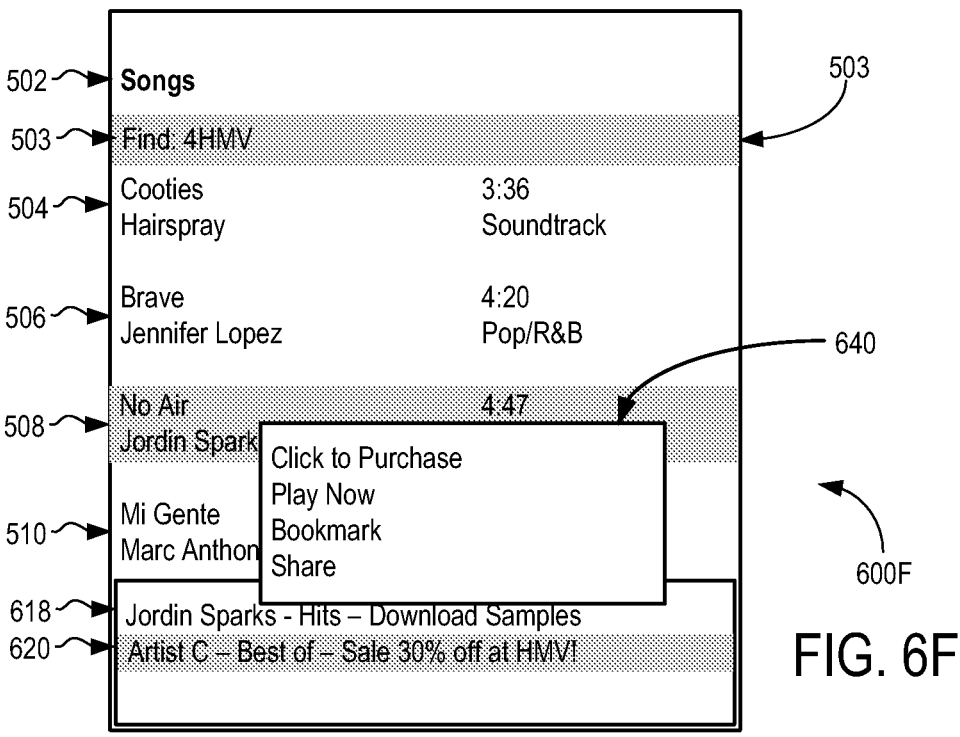
FIG. 6F shows a menu which may provide various selectable options.

Now referring to FIG. 6F, as another illustrative example, shown is an illustrative menu 640 that may provide a direct Click to Purchase option, and also provide other selectable options such as Play Now, Bookmark, or Share. The Click to Purchase option may allow immediate downloading of the song or album if the user has an account. As well the Play Now option may provide a sample clip allowing a sample to be played. Bookmark may save the access link for future reference, subject to any time limits on the access link. Finally, the Share option may allow forwarding of the link to another device.

In an embodiment, a list of previously entered keywords, vanity short codes, or short codes may be stored in a history log, and this history log may be made available to the user for review when the user returns to a location, such as a specific HMV store. For example, a number of different short codes or keywords for artists, songs or albums previously used at an HMV store may be retrieved from flash memory 108 in device 100 to provide a list of keywords or short codes to select from. This may be cross referenced to access links currently available at a specific HMV store, for example, and those access links may be made available for selection. Thus, in this case, location based notifications may be based on prior usage patterns of short codes or keywords entered previously at a particular geographic location.

Figure 7:
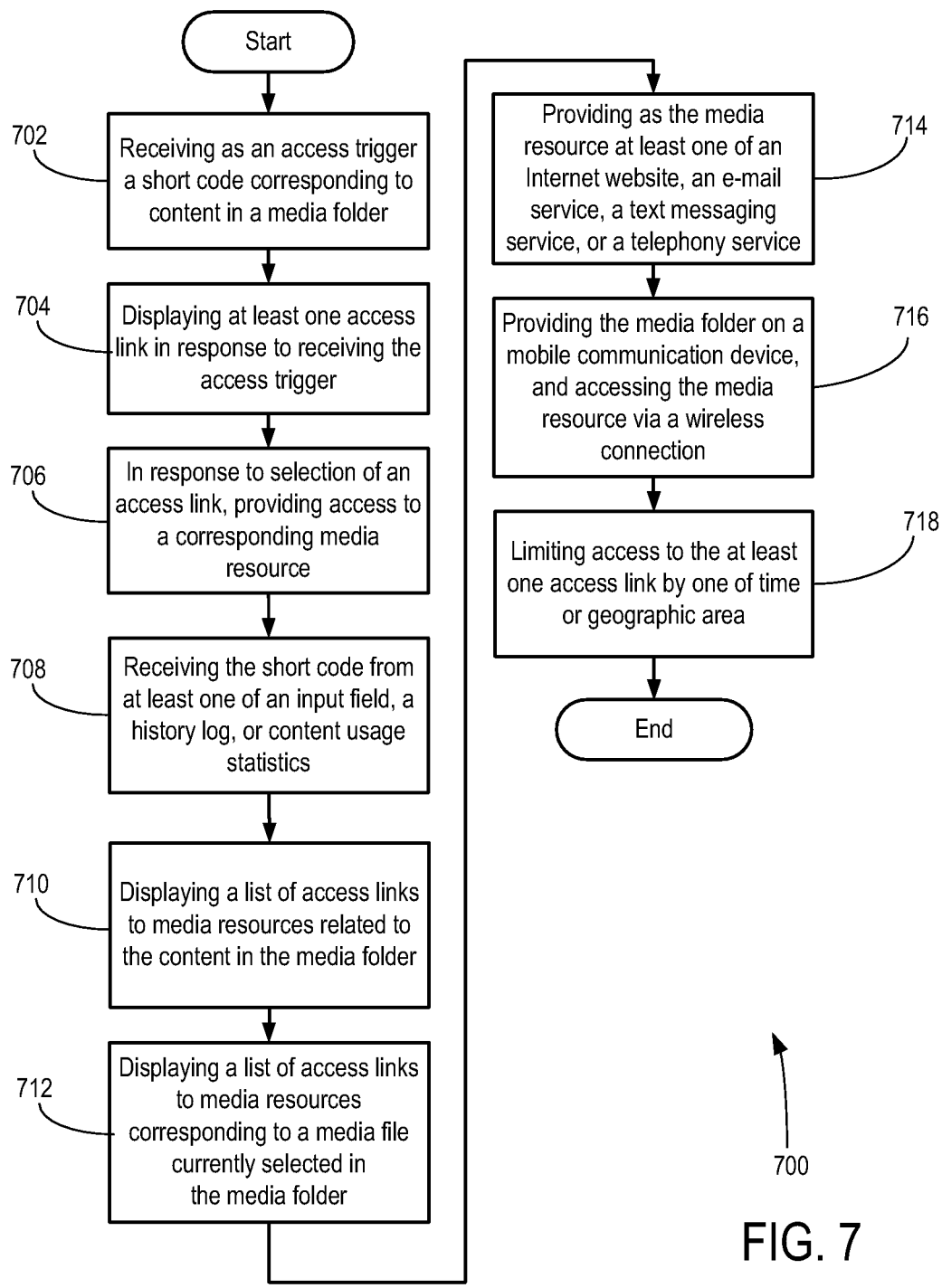
FIG. 7 is a schematic flow chart of a method in accordance with an embodiment.

Now referring to FIG. 7, shown is a schematic flowchart of a method 700 in accordance with an embodiment. As shown, method 700 begins and at block 702 method 700 receives as an access trigger a short code corresponding to content in a media folder. As described above, access link module 149 may be responsive to any number of access triggers including receiving entry of a search term or short code or vanity short code into a search field, for example. This was described above with reference to FIG. 5B and FIG. 6A. Alternatively, as described above, the search term or short code or vanity short code may be based on previously used access triggers, or may be based on media content usage statistics (i.e. by the user of the device) such as the most commonly listened to artist, song or album in the media folder, or the most commonly viewed video clip.

Next, at block 704, method 700 displays at least one access link in response to receiving the access trigger. For example, if the access trigger is a short code or vanity short code or keyword entered into an input field, then one or more access links corresponding to the short code or vanity short code or keyword are displayed. This was described above with reference to FIG. 6A, for example.

Next, at block 706, method 700 provides access to a corresponding media resource in response to selection of an access link at block 704. For example, one of the access links may be to an Internet web-based media resource. Another access link may be to a text messaging SMS media resource. This was described above with reference to FIG. 5D and FIG. 5E, for example.

Next, at block 708, method 700 may receive the access trigger from at least one of an input field, a history log, or content usage statistics, as previously described.

Next, at block 710, method 700 may display a list of access links to media resources related to the content of the media folder. For example, in FIG. 5B, in response to a short code or vanity short code entered into a search field, a list of access links to media resources related to the entered short code were displayed.

In another embodiment, at block 712, method 700 may display a list of access links to media resources corresponding to a media file currently selected in the media folder. This was described above with reference to FIG. 6A and FIG. 6C, for example. Method 700 then ends.

In another embodiment, other media applications may be accessed including images, games and videos related to the short code. As noted above, this content may be wrapped with promotions or advertising to offer the content for free or for reduced prices.

In another embodiment, there may be more than one short code related to a given location. For example, a music store may offer multiple short codes corresponding to various different artists. In this case, the most commonly listened to artist or artists (i.e. listened to by the user of device 100) may be in the ad shown on device 100, and the additional short codes may be displayed as additional choices within a list.

Thus, in an aspect, there is provided a computer-implemented method of providing access links in a media folder, the method comprising: receiving as an access trigger a short code corresponding to content in the media folder; displaying at least one access link in response to receiving the access trigger; and in response to selection of an access link, providing access to a corresponding media resource.

In an embodiment, the method further comprises receiving the access trigger from at least one of an input field, a history log or content usage statistics.

In another embodiment, the method further comprises displaying a list of access links to media resources related to the content in the media folder.

In another embodiment, the method further comprises displaying a list of access links to media resources corresponding to a media file currently selected in the media folder.

In another embodiment, the media resource comprises at least one of an Internet website, an electronic mail service, a text messaging service, or a telephony service.

In another embodiment, the media folder is provided on a mobile communication device; and the media resource is accessed via a wireless connection.

In another embodiment, the method further comprises limiting access to the at least one access link based on at least one of time or geographic area.

In another aspect, there is provided a mobile communications device having a media folder, the mobile communications device comprising: an access module for receiving as an access trigger a short code corresponding to content in the media folder; a display for displaying at least one access link in response receiving the access trigger; and access means for providing access to a corresponding media resource in response to selection of an access link.

In an embodiment, the device further comprises means for receiving the access trigger from at least one of an input field, a history log or content usage statistics.

In another embodiment, the device further comprises means for displaying a list of access links to media resources related to the content in the media folder.

In another embodiment, the device further comprises for displaying a list of access links to media resources corresponding to a media file currently selected in the media folder.

In another embodiment, the media resource accessed comprises at least one of an Internet website, an electronic mail service, a text messaging service, or a telephony service.

In another embodiment, the media folder is provided on a mobile communication device, and wherein the media resource is accessed via a wireless connection.

In another embodiment, the device further comprises means for limiting access to the at least one access link based on at least one of time or geographic area.

In another aspect, there is provided a computer readable medium product storing computer code that when loaded into a mobile communication device adapts the device to perform a method of providing access links in a media folder, the device being adapted to: receive as an access trigger a short code corresponding to content in the media folder; display at least one access link in response to receiving the access trigger; and in response to selection of an access link, provide access to a corresponding media resource.

In an embodiment, the computer readable medium further comprises code to receive the access trigger from at least one of an input field, a history log or content usage statistics.

In another embodiment, the computer readable medium further comprises code to display a list of access links to media resources related to the content in the media folder.

In another embodiment, the computer readable medium further comprises code to display a list of access links to media resources corresponding to a media file currently selected in the media folder.

In an embodiment, the computer readable medium further comprises code for accessing at least one of an Internet website, an electronic mail service, a text messaging service, or a telephony service.

In an embodiment, the computer readable medium further comprises code for providing as the access link at least one of an Internet website, an electronic mail service, a text messaging service, or a telephony service. The within embodiments are implementable on non-transitory computer-readable media.

While illustrative embodiments have been described above, it will be appreciated that various changes and modifications may be made. More generally, the scope of the invention is defined by the following claims.

What is claimed is:

1. A computer-implemented method comprising:
   displaying at a communication device a content item in a media folder at the communication device;
   during display of the content item, receiving as an access trigger an input of a search term keyword corresponding to the content item, the content item comprising metadata for a song, a video, an image, or a game, wherein the search term keyword is a unique designated string assigned to the content item for access of the content item by a plurality of communication devices on a network, and wherein respective uses of the search term keyword on the plurality of communication devices results in a display of the content item;
   in response to receiving said search term keyword by the communication device,
      displaying a selection of said content item on the communication device; and
      while said content item is selected, displaying one or more access links each corresponding to a resource, at least one of said access links comprising a link to a messaging module comprised in the communication device;
   in response to selection on the communication device of a displayed access link, providing access to its corresponding resource.

2. The method of claim 1, wherein the messaging module comprises an email module.

3. The method of claim 1, wherein the one or more access links comprise access links to media resources related to the content item.

4. The method of claim 1, wherein the messaging module comprises a text messaging module.

5. The method of claim 1, wherein the messaging module comprises a telephony module.

6. The method of claim 1, wherein the communication device is a mobile communication device, and a further one of said access links corresponds to a resource accessible via a wireless connection.

7. The method of claim 1, further comprising limiting access to the corresponding resource based on at least one of time or geographic area.

8. The method of claim 1, wherein the search term keyword is obtained using content usage statistics for said media folder.

9. A mobile communications device having a media folder, the mobile communications device comprising:
   a display for displaying a content item in the media folder;
   an access module for receiving, during display of the content item, as an access trigger an input of a search term keyword corresponding to a content item in the media folder, the content item comprising metadata for a song, a video, an image, or a game, wherein the search term keyword is a unique designated string assigned to the content item for access of the content item by a plurality of communication devices on a network, and wherein respective uses of the search term keyword on the plurality of communication devices results in a display of the content item;
   a messaging module;
   wherein the display of the mobile communications device, in response to receiving said search term keyword by the mobile communications device, displays:
      a selection of said content item; and
      while said content item is selected, one or more access links each corresponding to a resource, at least one of said access links comprising a link to the messaging module; and
   access means for providing access to a resource in response to selection on the mobile communications device of its corresponding displayed access link.

10. The device of claim 9, wherein the messaging module comprises an email module.

11. The device of claim 9, wherein the one or more access links comprise access links to media resources related to the content in item.

12. The device of claim 9, wherein the messaging module comprises a text messaging module.

13. The device of claim 9, wherein the messaging module comprises a telephony module.

14. The device of claim 9, wherein a further one of said access links corresponds to a resource accessible via a wireless connection.

15. The device of claim 9, further comprising means for limiting access to the resource corresponding to the selected displayed access link based on at least one of time or geographic area.

16. The device of claim 9, wherein the search term keyword is obtained using content usage statistics for said media folder.

17. A non-transitory computer readable medium product storing computer code that when loaded into a mobile communication device adapts the device to perform a method of providing access links in a media folder, the method comprising:

displaying at a communication device a content item in a media folder at the communication device;

receiving, during display of the content item, as an access trigger an input of a search term keyword corresponding to the content item, the content item comprising metadata for a song, a video, an image, or a game, wherein the search term keyword is a unique designated string assigned to the content item for access of the content item by a plurality of communication devices on a network, and wherein respective uses of the search term keyword on the plurality of communication devices results in a display of the content item;

in response to receiving said search term keyword by the mobile communication device, displaying a selection of said content item on the mobile communication device; and while said content item is selected, displaying one or more access links each corresponding to a resource, at least one of said access links comprising a link to a messaging module comprised in the mobile communication device;

in response to selection on the mobile communication device of a displayed access link, providing access to its corresponding resource.

18. The non-transitory computer readable medium product of claim 17, wherein the messaging module comprises an email module.

19. The non-transitory computer readable medium product of claim 17, wherein the one or more access links comprise access links to media resources related to the content item.

20. The non-transitory computer readable medium product of claim 17, wherein the messaging module comprises a text messaging module.

21. The non-transitory computer readable medium product of claim 17, wherein the messaging module comprises a telephony module.

22. The non-transitory computer readable medium product of claim 17, wherein the method further comprises limiting access to the corresponding resource based on at least one of time or geographic area.

23. The non-transitory computer readable medium product of claim 17, wherein the search term keyword is obtained using content usage statistics for said media folder.

\* \* \* \* \*